(12) United States Patent
Shimada et al.

(10) Patent No.: US 7,409,063 B2
(45) Date of Patent: Aug. 5, 2008

(54) CONTENTS DISTRIBUTION SYSTEM

(75) Inventors: Muneki Shimada, Tokyo (JP); Keiso Shimakawa, Kanagawa (JP); Toyoshi Okada, Tokyo (JP); Minoru Hashimoto, Tokyo (JP)

(73) Assignee: Sony Computer Entertainment Inc. (JP)

( * ) Notice: Subject to any disclaimer, the term of this patent is extended or adjusted under 35 U.S.C. 154(b) by 724 days.

(21) Appl. No.: 10/108,072

(22) Filed: Mar. 27, 2002

(65) Prior Publication Data

US 2002/0166054 A1 Nov. 7, 2002

(30) Foreign Application Priority Data

Mar. 28, 2001 (JP) ............................ P2001-094419

(51) Int. Cl.
*H04L 9/08* (2006.01)

(52) U.S. Cl. ...................... 380/279; 380/278; 713/189; 705/51; 705/52

(58) Field of Classification Search ................ 713/168, 713/179, 172, 200, 201, 189, 193, 150; 380/284, 380/273, 277–279; 705/1, 30, 50–53, 56, 705/57, 59–60; 726/26
See application file for complete search history.

(56) References Cited

U.S. PATENT DOCUMENTS

| | | | | | |
|---|---|---|---|---|---|
| 4,757,534 | A | * | 7/1988 | Matyas et al. | 705/56 |
| 5,050,213 | A | | 9/1991 | Shear | |
| 5,319,705 | A | * | 6/1994 | Halter et al. | 705/54 |
| 5,592,549 | A | | 1/1997 | Nagel et al. | |
| 5,937,395 | A | * | 8/1999 | Iwamura | 705/30 |
| 6,011,848 | A | * | 1/2000 | Kanda et al. | 713/170 |
| 6,016,509 | A | * | 1/2000 | Dedrick | 709/224 |
| 6,108,420 | A | * | 8/2000 | Larose et al. | 705/59 |
| 6,189,146 | B1 | * | 2/2001 | Misra et al. | 717/177 |
| 6,226,618 | B1 | * | 5/2001 | Downs et al. | 705/1 |
| 6,438,233 | B1 | * | 8/2002 | Yoshimune et al. | 380/241 |
| 6,684,198 | B1 | * | 1/2004 | Shimizu et al. | 705/50 |
| 6,792,113 | B1 | * | 9/2004 | Ansell et al. | 380/284 |
| 6,868,403 | B1 | * | 3/2005 | Wiser et al. | 705/51 |
| 6,907,407 | B1 | * | 6/2005 | Yamanoue et al. | 705/57 |
| 6,975,730 | B1 | * | 12/2005 | Kuroiwa et al. | 380/284 |
| 2001/0010046 | A1 | * | 7/2001 | Muyres et al. | 705/52 |

(Continued)

FOREIGN PATENT DOCUMENTS

EP 1 014 618 6/2000

(Continued)

*Primary Examiner*—Matthew Heneghan
*Assistant Examiner*—Yin-Chen Shaw
(74) *Attorney, Agent, or Firm*—Lerner, David, Littenberg, Krumholz & Mentlik, LLP (57) ABSTRACT

A digital contents distribution system has a multi-layered structure including a server device (CS device) of one or a small number of managers which are each to be a manager main body, a plurality of server devices (DS devices) of middle managers, and client terminal devices (SC terminal devices) of a large number of users. Accesses from the respective users are processed in the server devices of respective ones of the middle managers. It is therefore possible to prevent an inconvenience in which the accesses from a large number of users concentrate on the CS device of the manager. As a result, it is possible to reduce the load imposed on the CS device, and to perform a smooth distribution service of digital contents.

9 Claims, 5 Drawing Sheets

U.S. PATENT DOCUMENTS

2001/0032312 A1 * 10/2001 Runje et al. .................. 713/172
2001/0039587 A1    11/2001 Uhler et al.
2002/0077988 A1 *  6/2002 Sasaki et al. .................. 705/59
2002/0124177 A1 *  9/2002 Harper et al. ................ 713/189

FOREIGN PATENT DOCUMENTS

| | | |
|---|---|---|
| EP | 1014618 A1 | 6/2000 |
| JP | 10-021302 A | 1/1998 |
| JP | 2000078555 A | 3/2000 |
| JP | 2001-056796 A | 2/2001 |
| JP | 2001-078171 A | 3/2001 |
| JP | 2002023769 A | 1/2002 |
| JP | 2002-528818 A | 9/2002 |
| JP | 2002-540508 A | 11/2002 |
| WO | WO-00/07329 A1 | 2/2000 |
| WO | WO-00/22539 A1 | 4/2000 |
| WO | WO-00/57309 A2 | 9/2000 |
| WO | WO-01/16932 A1 | 3/2001 |

* cited by examiner

CONTENTS DISTRIBUTION SYSTEM

CROSS-REFERENCE TO RELATED APPLICATIONS

This application claims priority from Japanese Patent Application No. 2001-094419 filed on Mar. 28, 2001, the disclosure of which is hereby incorporated by reference herein.

BACKGROUND OF THE INVENTION

The present invention relates to a distribution system and a distribution method thereof for distributing digital contents, such as game contents, music contents, and movie contents.

In recent years, there have been available network distribution services for distributing digital contents, such as game contents, music contents, and movie contents, via a network such as the Internet.

In the case of such a network distribution service, a user connects his or her client terminal device to a server device of a manager's side via a network. The user directly receives digital contents from the server device of the manager. This is a general contents distribution system of the network distribution service.

However, when the number of users who desire the distribution of digital contents becomes large, the manager needs to distribute the digital contents in response to requests from a large number of users. Therefore, a heavy load is imposed on the server device for performing the distribution of the digital contents. Then, there occurs a problem of a breakdown of the server device, which disrupts the smooth distribution of the digital contents.

SUMMARY OF THE INVENTION

It is an object of the present invention to provide a distribution system and a distribution method capable of reducing the load imposed on a server device of a manager for distributing digital contents, and enabling a smooth distribution of the digital contents even when there are accesses from a large number of users.

A distribution system of the present invention includes distributing units for a plurality of middle managers which are to constitute an intermediate layer between a distributing unit for a manager which is to be an upper layer and a terminal for a user which is to be a lower layer. And, this distribution system of the present invention processes the accesses from a large number of users with the distributing units of the respective middle managers.

As a result, even when a large number of users desire contents distribution, smooth contents distribution is made possible.

DETAILED DESCRIPTION

The present invention can be applied to a contents distribution system for distributing digital contents, such as game contents, music contents, and movie contents, which a content creator has created.

Entire Structure of Contents Distribution System

Figure 1:
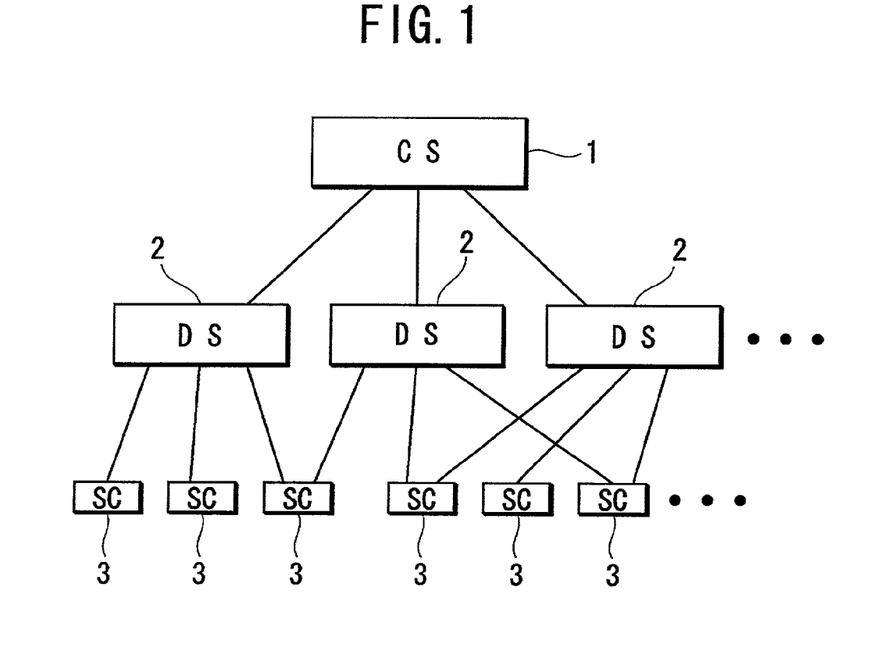
FIG. 1 is a diagram showing a multi-layered hierarchical structure of a contents distribution system according to an embodiment to which the present invention is applied.

At first, FIG. 1 shows the entire structure of a contents distribution system according to an embodiment of the present invention. As can be seen from FIG. 1, the contents distribution system according to this embodiment includes a CS device 1 (CS: Central Server) which is a server device of a manager arranged in an upper layer of this system.

The contents distribution system also includes a plurality of DS devices 2 (DS: Distribution Server) which are server devices of middle managers arranged in an intermediate layer of this system.

Also included in the contents distribution system are SC terminal devices 3 (SC: Service Client) of a large number of users arranged in a lower layer of this system.

Further, the contents distribution system is configured so that the CS device 1, the DS devices 2 and the SC terminal devices 3 are hierarchically connected via a predetermined network, such as the Internet.

FIG. 1 shows the CS device 1 which is to be the upper layer as one server device, but a plurality of CS devices 1 can be provided in the system.

CS Device

The CS device 1 provides an S-HSD device (Server-side Hardware Security device: refer to numeral 5 in FIG. 2) which is a hardware device connected to the DS device 2 of each middle manager. The CS device 1 provides a correspondence middleware for controlling the DS device 2 of each middle manager in conformity to this system operation. Further, the CS device 1 issues DS certificates to the middle managers which each certify that they are a middle manager.

A public key certification is performed between the DS device 2 and the SC terminal device 3 of a user. A content key is distributed from the DS device 2 to the SC terminal device 3 of the user. An S-HSD device 5 of the DS device 2 records a "certification log" which represents a history of this public key certification. The S-HSD device 5 records a "distribution log" which represents a history of a content key distribution. Further, the S-HSD device 5 records an "access log" which represents the content of accesses by the user.

The CS device 1 collects the respective "logs" in an online or offline manner. The CS device 1 performs account processing of a license fee and the like for the middle manager of the DS device 2 on the basis of the collected "logs". Details thereof will be described later.

A private key certification may be performed between the DS device 2 and the SC terminal device 3 of the user.

DS Device

As each middle manager, in addition to a middle manager which is newly provided dedicated for this system, for example, an existing Internet service provider (ISP) or the like may be provided.

The DS device 2 of each middle manager operates on the basis of the correspondence middleware provided from the manager. The public key certification is performed between the DS device 2 and the SC terminal device 3. Further, the DS device 2 issues client certificates of this contents distribution system to the respective users described in a user list.

Figure 2:
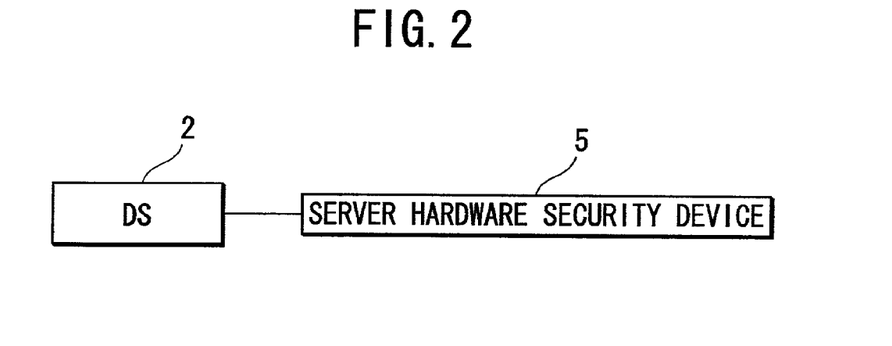
FIG. 2 is a diagram showing a middle manager side structure of the contents distribution system according to the embodiment to which the present invention is applied.

The S-HSD device 5 (Server-side Hardware Security device) shown in FIG. 2 is connected to this DS device 2. This S-HSD device 5 is a secure hardware device whose internal structure can be known only by the above manager.

This S-HSD device 5 operates on the basis of the correspondence middleware provided from the manager. When the public key certification is performed between the DS device 2 and the SC terminal device 3, the S-HSD device 5 counts the number of certification accesses with a certification counter provided in the inside thereof.

A count value of this certification counter is recorded as the "certification log" together with various information on the public key certification. This "certification log" is collected by the CS device 1 in online or offline manner.

In this embodiment, the S-HSD device 5 is explained as a hardware device. However, the S-HSD device 5 may be realized with a software program.

SC Terminal Device

The SC terminal device 3 corresponds to, for example, a video game machine having a network connecting function, a personal computer device having a network connecting function, or the like which each user owns.

This SC terminal device 3 operates on the basis of a middleware corresponding to this system. The public key certification is performed between the SC terminal device 3 and the DS device 2 on the basis of the client certificate issued from the CS device 1 of the manager or the DS device 2 of the middle manager. As the client certificate, for example, a user name, a password, and the like may be employed.

Figure 3:
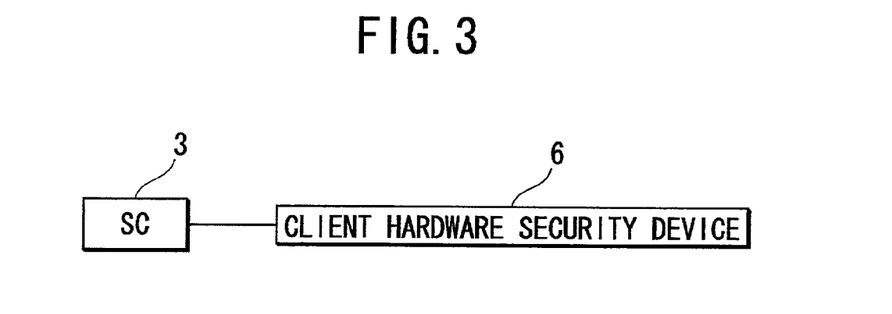
FIG. 3 is a diagram showing a user side structure of the contents distribution system according to the embodiment to which the present invention is applied.

A C-HSD device 6 (Client Hardware Security device) is connected to the SC terminal device 3 as shown in FIG. 3. This C-HSD device 6 is a secure hardware device whose internal structure can be accessed only by the above manager. Between this C-HSD device 6 and the SC terminal device 3, information which is encrypted by using the private key of the CS device 1 is transmitted and received.

System Operation of Contents Distribution System

In such a contents distribution system, contents which is encrypted on the basis of a predetermined encryption key is distributed in an online manner, or stored in a storage medium, such as a CD, a DVD, or the like, to be distributed to the user. The user accesses the middle manager and downloads the content key which is a decryption key for the encrypted contents. The user decrypts the contents by using this content key to utilize the contents.

In the S-HSD device 5 of the middle manager, information on the public key certification which is performed when the user downloads the content key, or information on the downloading of the content key, is recorded as "log." The manager collects the "log" recorded in this S-HSD device 5 in an online or offline manner. The manager performs the account processing of a royalty or the like for at least the middle manager.

Public Key Certification

At first, when the user enjoys the contents distribution service of this contents distribution system, the public key certification including a user certification is performed between the SC terminal device 3 of the user and the DS device 2 of the middle manager.

Public Key Certification Operation Where Middle Manager is Main Body

Figure 4:
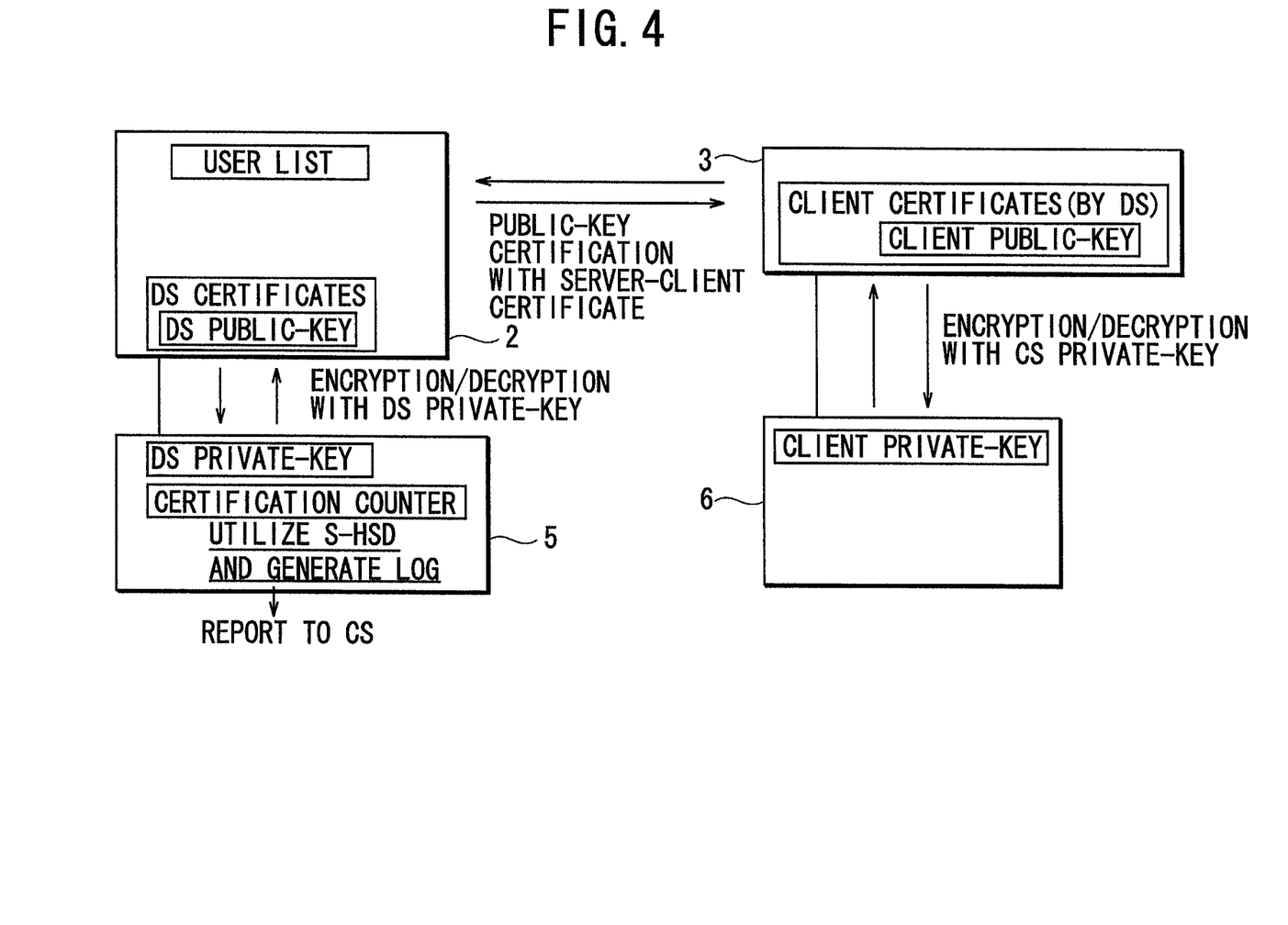
FIG. 4 is a diagram for explaining a public key certification operation in which a middle manager is a main body, and a recoding operation of a log concerning this public key certification in the contents distribution system according to the embodiment to which the present invention is applied.

FIG. 4 is a schematic diagram of the public key certification operation when the user list is held in the DS device 2 of the middle manager. As can be seen from FIG. 4, this public key certification is performed on the basis of the DS certificates issued from the CS device 1, which are stored in the DS device 2 of the middle manager, and the client certificate, such as a user name and a password, issued from the middle manager, which is stored in the SC terminal device 3 of the user.

The client certificate may be issued in the form of a so-called online signup. Alternatively, the client certificate may be issued to the user by regular mail.

When the public key certification performed between the DS device 2 and the SC terminal device 3 is normally terminated, the user can download the content key for decrypting the encrypted digital contents from the DS device 2. Details thereof will be described later.

Recording of Log

Here, in this contents distribution system, when the public key certification is performed between the DS device 2 and the SC terminal device 3, the S-HSD device 5 counts the number of times this public key certification is performed with the certification counter. Further, the S-HSD device 5 forms various information on the public key certification and records the certification count value and the various information on the public key certification as the "certification log."

The CS device 1 periodically or non-periodically collects the "certification log" recorded in the S-HSD device 5 in an online or offline manner. The CS device 1 performs the account processing of the license fee of this system for the middle manager on the basis of the collected "certification log."

This account processing may be performed at a metered rate or a monthly basis.

In this system, the public key certification is performed in the DS device 2 of the middle manager on the basis of the user list. As a result, the middle manager performs management of each user. Therefore, the manager does not directly manage each user that is a member of this system. However, the manager can indirectly manage the users by collecting the "certification log" recorded in the S-HSD device 5 of the DS device 2 of the middle manager.

Public Key Certification Operation Where Manager is Main Body

Figure 5:
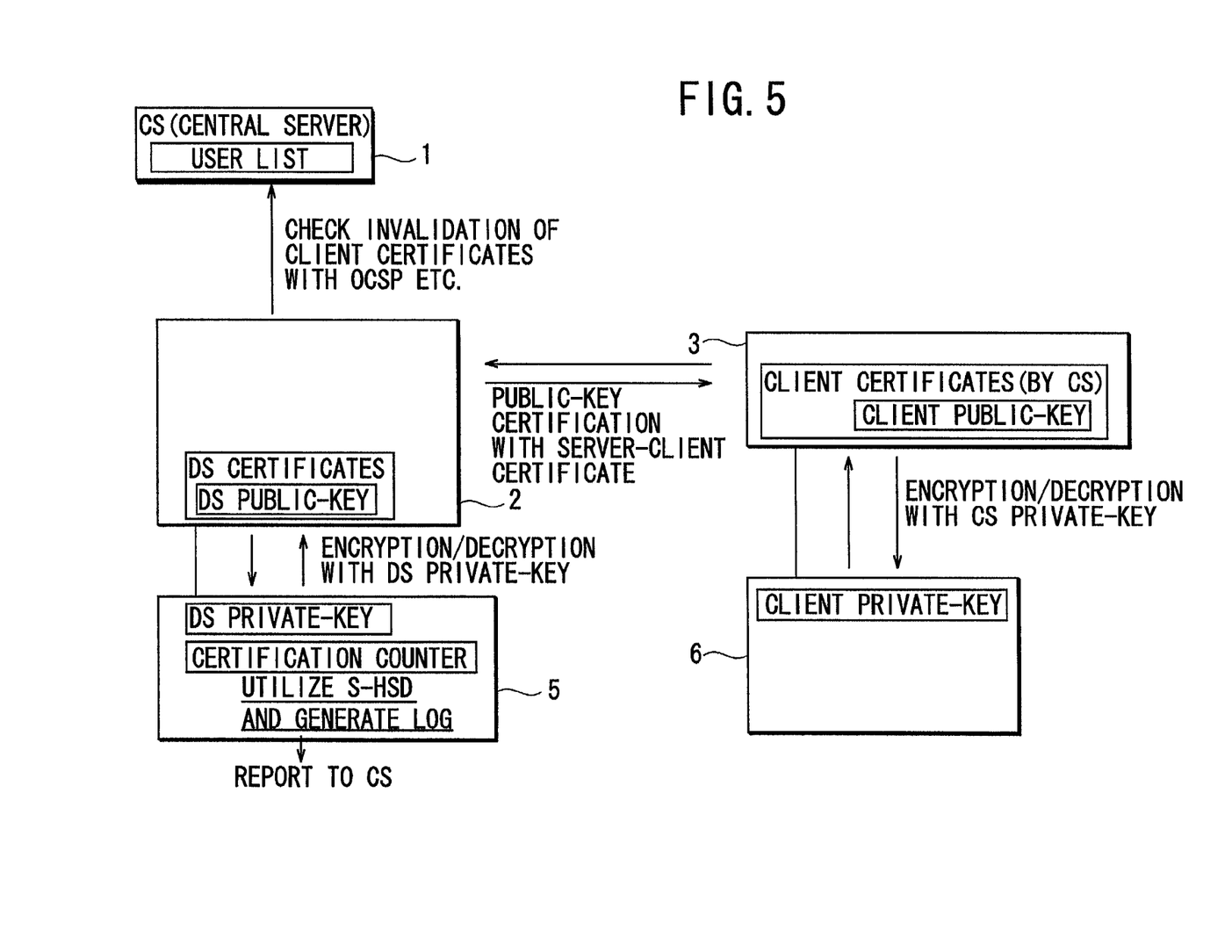
FIG. 5 is a diagram for explaining the public key certification operation in which a manager is a main body, and the recording operation of the log concerning this public key certification in the contents distribution system according to the embodiment to which the present invention is applied.

Next, FIG. 5 is a schematic diagram showing the public key certification operation when the user list is held in the CS device 1 of the manager. Even in this case, the public key certification is performed on the basis of the DS certificates issued from the CS device 1 which are stored in the DS device 2 of the middle manager, and the client certificate issued from the middle manager which is stored in the SC terminal device 3 of the user. However, in this case, since the user list is held in the CS device 1 of the manager, it is necessary to check whether the client certificate has been invalidated.

Therefore, a communication is performed on the basis of, for example, an OCSP (Online Certificate Status Protocol) between the DS device 2 and the CS device 1 which holds the user list. The DS device 2 checks the invalidation of the client certificate in this communication, and performs the public key certification similar to the above description.

As a result, even when the user list is held in the CS device 1 of the manager, with the S-HSD device 5 connected to the DS device 2, the "certification log" on the basis of this public key certification is formed. Further, this "certification log" can be collected with the CS device 1.

Downloading of Content Key

Next, in this contents distribution system, the digital contents stored in the storage medium have been subjected to encryption processing with the content key. Further, the digital contents downloaded from the DS device 2 have been subjected to the encryption processing with the content key.

Therefore, in order to use the acquired digital contents, the user needs to acquire the content key and apply decryption processing to the digital contents. The downloading of this content key can be performed after the aforementioned public key certification is normally terminated.

Figure 6:
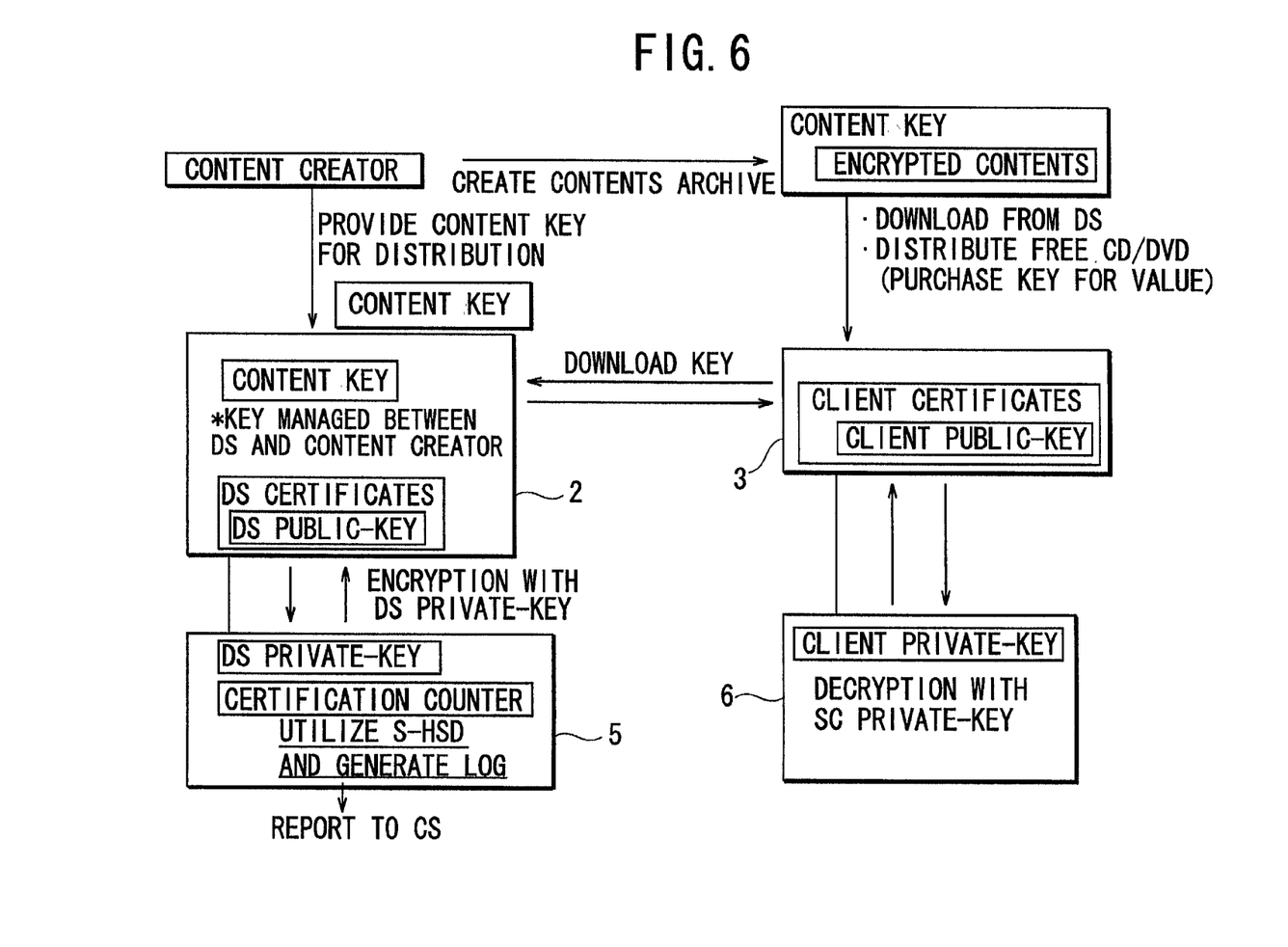
FIG. 6 is a diagram for explaining a distributing operation of a content key in the case where a content key for decrypting digital contents is managed by a content creator and by the middle manager.

A Case Where the Content Key is Managed by the Content Creator and by a Middle Manager At first, the content key can be managed by the content creator and by a middle manager. FIG. 6 is a diagram schematically showing a flow of the downloading of the content key.

In FIG. 6, the content creator encrypts the digital contents which he/she has created with an arbitrary content key, and stores the contents in a storage medium, such as a CD, DVD, or the like, to distribute the contents to the user. Alternatively, the content creator encrypts the digital contents which he/she has created with an arbitrary content key and distributes the contents to the middle managers.

Further, the content creator delegates the distribution of the content key used when these digital contents are encrypted to the middle manager.

When the aforementioned public key certification is normally terminated, the DS device 2 of the middle manager distributes the content key to the SC terminal device 3 of the user. Therefore, the user can decrypt the encrypted digital contents with this content key and appropriately utilize the contents.

Further, when the content key is distributed to the user, the S-HSD device 5 connected to the DS device 2 records the "distribution log" concerning the distribution of this content key. The "distribution log" concerning the distribution of this content key is collected by the CS device 1 of the manager together with the "certification log" concerning the aforementioned public key certification. The CS device 1 performs the account processing of the royalty for the middle manager on the basis of these collected "logs." In this case, the account processing is performed on the basis of the number of distributed content keys.

Figure 7:
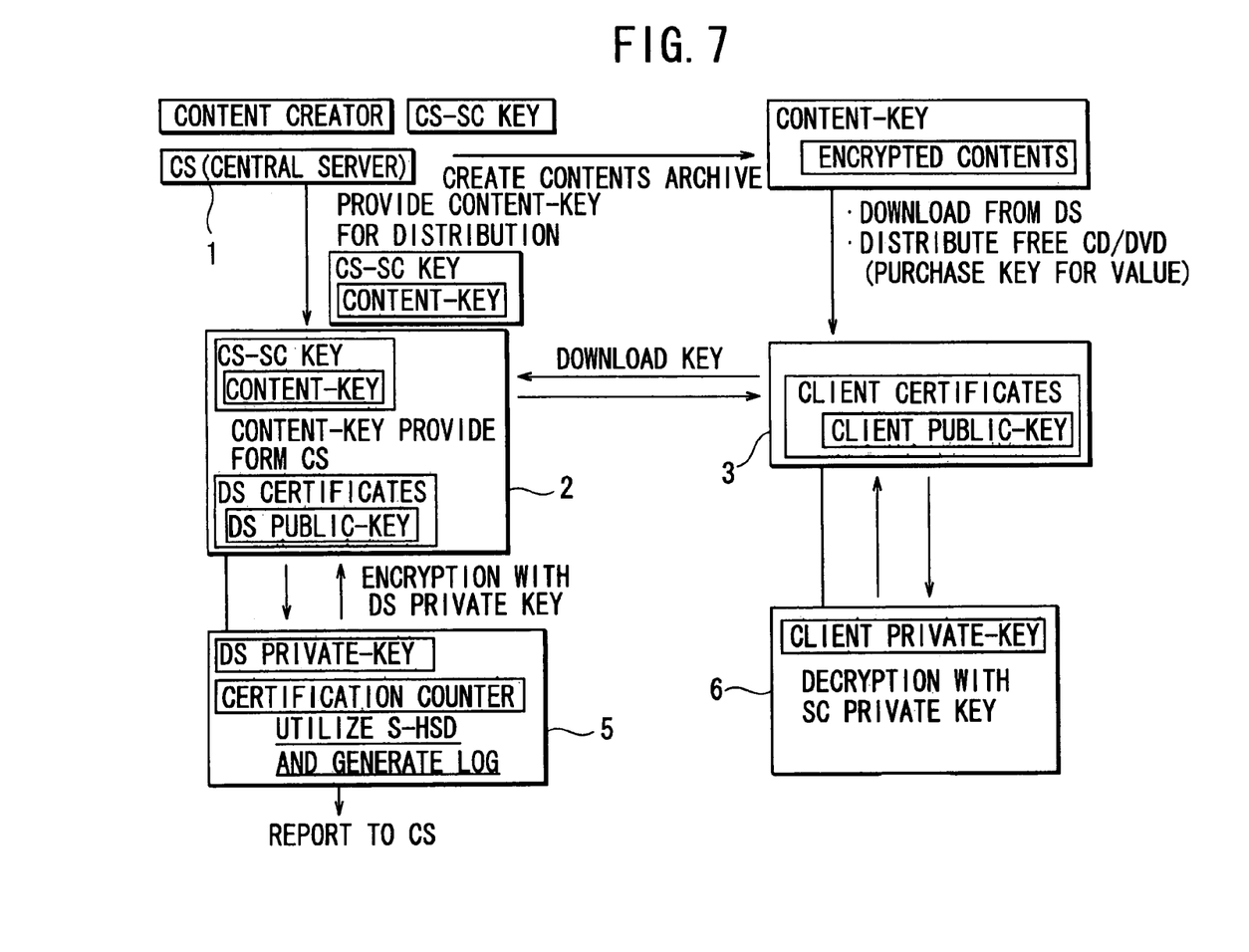
FIG. 7 is a diagram for explaining the distributing operation of the content key in the case where the content key for decrypting digital contents is managed by the content creator and by the manager.

A case Where the Content Key is Managed by the Content Creator and by the Manager The content key also can be managed by the content creator and by the manager. FIG. 7 is a diagram schematically showing the flow of the downloading of the content key in this case.

In FIG. 7, the content creator encrypts the digital contents which he/she has created with an arbitrary content key. The content creator stores these digital contents in a storage medium, such as a CD, a DVD, or the like, and distributes the contents to the user or the middle manager.

Further, the content creator encrypts the content key used when these digital contents are encrypted with a center encryption key (CS-SC Key) which is designated from the manager to distribute the content key to the middle manager.

In this case, the center encryption key (CS-SC Key) used to encrypt the content key is not disclosed to the middle manager. Therefore, the middle manager cannot decrypt the content key.

The center encryption key (CS-SC Key) used to encrypt the content key is distributed from the CS device 1 of the manager to the SC terminal device 3 of the user.

After the aforementioned public key certification is normally terminated, the user who has acquired the digital contents stored in the storage medium, or by downloading from the DS device 2 of the middle manager, operates the SC terminal device 3 and downloads the content key encrypted with the center encryption key (CS-SC Key) from the DS device 2.

The SC terminal device 3 uses the center encryption key (CS-SC Key) distributed from the CS device 1 of the manager to decrypt the content key. The SC terminal device 3 then uses the decrypted content key to decrypt the digital contents encrypted with the content key.

As a result, the content key with which the digital contents have been encrypted is not known to the middle manager, and the content key can be managed by the content creator and by the manager.

Even in this case, the "distribution log" concerning the distribution of this content key is recorded in the S-HSD device 5, and is collected by the CS device 1 of the manager. The CS device 1 performs the account processing of the royalty for the middle manager on the basis of the collected "log."

As is apparent from the above description, this contents distribution system provides a plurality of DS devices 2 of the middle managers for the CS device 1 of one or a small number of managers. When the user enjoys the desired contents distribution service, the user accesses not the CS device 1 of the manager but the DS device 2 of the middle manager.

In other words, one or a small number of managers do not provide the service to a large number of users. Rather, a plurality of middle managers, each in charge of a plurality of users, collectively provide the service to a large number of users.

Since the accesses from a large number of users can be processed in the DS devices 2 of the middle managers in charge, it is possible to prevent an inconvenience in which a load is intensively imposed on the CS device 1 of the manager. Therefore, a smooth distribution of the digital contents is enabled.

Further, the accounting processing of the license fee for each middle manager is performed on the basis of a "log" concerning the public key certification and (or) the downloading of the content key, recorded in the S-HSD device 5 of the DS device 2 of the middle manager. Therefore, according to the processing of the collected "log", it is possible to employ various accounting bases, such as a metered rate, a monthly basis, and the like.

In addition, in the above description of the invention, this contents distribution system employs a three-layered structure comprising the CS device 1 of the manager, the DS devices 2 of the middle managers, and the SC terminal devices 3 of the users. However, this contents distribution system may be a multi-layered structure having four or more layers in which additional server devices of the middle managers are provided, for example, between the CS device 1 of the manager and the DS devices 2 of the middle managers, or the DS devices 2 of the middle managers and the SC terminal devices 3 of the users.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A content distribution system, comprising:
a plurality of user terminals, each operable to obtain encrypted content either i) by electronic transmission over a network, or ii) by reading a portable storage medium inserted into that user terminal, to receive a center encryption key and an encrypted content key without requiring the encrypted content key to be obtained together with the encrypted content, the encrypted content key being encrypted with the center encryption key, each of the plurality of user terminals further being operable to use the center encryption key to decrypt the encrypted content key to obtain a decrypted content key, and to decrypt the encrypted content using the decrypted content key to form decrypted content, and to reproduce the decrypted content;
a plurality of transmitting units, each having a management function and each being operable to electronically transmit the encrypted content key over the network to ones of the plurality of user terminals and to record log information representing the number of transmissions of the encrypted content key by that transmitting unit; and
a management unit other than the plurality of transmitting units, the management unit being operable to manage the center encryption key, to transmit the center encryption key to the ones of the plurality of user terminals without disclosing the center encryption key to the management functions of the plurality of transmitting units, to collect the log information recorded by each of the plurality of transmitting units and to use the log information collected from each transmitting unit to manage the transmission of the encrypted content key by that transmitting unit.

2. The content distribution system according to claim 1, wherein each of the plurality of transmitting units is usable by a respective first manager of a plurality of first managers and the management unit is usable by a second manager to perform account processing for the plurality of first managers on the basis of the log information collected from each respective transmitting unit.

3. The content distribution system according to claim 1, wherein each of the plurality of transmitting units is usable by a respective first manager of a plurality of first managers and the management unit is usable by a second manager to perform account processing for the plurality of first managers on the basis of the collected log information.

4. The content distribution system according to claim 1, wherein each of the plurality of transmitting units is operable to record the log information i) when a predetermined certification is performed between that transmitting unit and a user terminal of the plurality of user terminals, ii) on downloading of the encrypted content, or iii) when the predetermined certification is performed and on downloading of the encrypted content.

5. A content distribution method, comprising:
obtaining first encrypted content by a first user terminal of a plurality of user terminals either i) by electronic transmission over a network from a first transmitting unit, or ii) by reading a portable storage medium inserted into the first user terminal;
electronically transmitting first center encryption key from a second transmitting unit other than the first transmitting unit over the network to the first user terminal;
electronically transmitting a first encrypted content key over the network to the first user terminal separately from any such electronic transmission in which the first user terminal obtains the first encrypted content;
using the first center encryption key at the first user terminal to decrypt the first encrypted content key to form a first decrypted content key;
using the first decrypted content key, decrypting the first encrypted content by the first user terminal to form first decrypted content;
reproducing the first decrypted content by the first user terminal;
obtaining second encrypted content by a second user terminal of the plurality of user terminals either i) by electronic transmission over the network from a third transmitting unit, or ii) by reading a portable storage medium inserted into the second user terminal;
electronically transmitting a second center encryption key from a fourth transmitting unit other than the third transmitting unit over the network to the second user terminal;
electronically transmitting a second encrypted content key over the network to the second user terminal separately from any such electronic transmission in which the second user terminal obtains the second encrypted content;
using the second center encryption key at the second user terminal to decrypt the second encrypted content key to form a second decrypted content key;
using the second decrypted content key, decrypting the second encrypted content by the second user terminal to form second decrypted content;
reproducing the second decrypted content by the second user terminal;
recording first log information representing the number of times the first encrypted content key is transmitted to the first user terminal;
separately recording second log information representing the number of times the second encrypted content key is transmitted to the second user terminal;
collecting the first and second log information by a manager; and
using the first and second log information collected by the manager, managing the transmission of the first encrypted content key to the first user terminal and the transmission of the second encrypted content key to the second user terminal.

6. The content distribution method as claimed in claim 5, wherein the first encrypted content key and the second encrypted content key are the same.

7. The content distribution method as claimed in claim 5, wherein the first encrypted content key and the second encrypted content key are different.

8. The content distribution method as claimed in claim 5, wherein the first encrypted content and the second encrypted content are the same and the first and second encrypted content keys are the same.

9. The content distribution method as claimed in claim 5, wherein the first and second encrypted content keys are the same and the first encrypted content and the second encrypted content include different content.

* * * * *